United States Patent [19]
Danjyo et al.

[11] 4,292,082
[45] Sep. 29, 1981

[54] UNSHAPED REFRACTORIES

[75] Inventors: Hiroyuki Danjyo; Shigeru Okuda, both of Bizen; Eiichi Yorita, Taiyo, all of Japan

[73] Assignee: Shinagawa Refractories Co. Ltd., Japan

[21] Appl. No.: 117,233

[22] Filed: Jan. 31, 1980

[30] Foreign Application Priority Data

Feb. 2, 1979 [JP] Japan .................................. 54-10332

[51] Int. Cl.$^3$ .............................................. C04B 35/52
[52] U.S. Cl. ..................................... 501/100; 501/101
[58] Field of Search ..................................... 106/56, 65

[56] References Cited

U.S. PATENT DOCUMENTS

| | | | |
|---|---|---|---|
| 3,775,140 | 11/1973 | Visser et al. | 106/56 |
| 4,072,531 | 2/1978 | Funabiki et al. | 106/56 |
| 4,184,883 | 1/1980 | Hughes et al. | 106/56 |
| 4,220,474 | 9/1980 | Uemura et al. | 106/56 |

*Primary Examiner*—James Poer
*Attorney, Agent, or Firm*—Pennie & Edmonds

[57] ABSTRACT

Unshaped refractories are disclosed which have incorporated therein granules comprising fine powder refractory and carbonaceous material. The fine powder refractory may be the refractories of magnesia clinker, dolomite, magnesia-dolomite, high alumina, recovered materials of such refractories recovered after use, and mixtures of two or more thereof. The carbonaceous material may be any one of: thermosetting resin, a thermoplastic resin to which has been added pitch and hardening agent, other resins, or mixtures of two or more thereof.

17 Claims, No Drawings

UNSHAPED REFRACTORIES

BACKGROUND OF THE INVENTION

1. Field of the Invention

The invention is directed to unshaped refractories having a carbon bond, which refractories are used as hot-gunning mixes for repairing and lining converters, as tap hole mud, and as runner and trough material for molding by use of vibration to provide the runner or trough used for discharging pig iron from blast furnaces, which unshaped refractories exhibit particularly excellent erosion resistance.

2. The Prior Art

It is known that carbon is effective to prevent slag, molten pig iron or molten steel from entering into the structure of refractories. One example is the brick used for converters, which brick is impregnated with tar. Another example is the nozzle stopper for a ladle used to pour ingots. Currently, a number of workers in the art have been directing their efforts toward the use of carbon to prevent slag, molten pig iron or molten steel from entering into the structure of refractories and, in particular, efforts have been made to use carbon for this purpose in such refractories as hot gunning mixes (gunning mixes) for converters, and runner and trough material (runner material) for vibration molding of the runners used for discharging pig iron from blast furnaces.

One such endeavor is disclosed in Japanese unexamined patent publication No. 17506/73, which is directed to refractory material for runners used for discharging pig iron from a blast furnace. In this publication, a refractory aggregate controlled in particle size is mixed with 10–30% by weight of hard pitch of medium grain size (0.07–1.0 mm). The refractories described in this publication are ones in which crushed hard pitch and aggregate is mixed by a mixer.

Japanese unexamined patent publication No. 127413/77 is directed to a method for repairing the walls of furnaces, such as converters, in which the surface of granular bodies is coated with a high softening point pitch. A quantity of separately prepared granules also coated with pitch of the same high softening point quality is granulated to the size range 0.2–2.0 mm. Less than several percent of the latter granules is added to and mixed with the earlier formed granules and the mixture is gunned to the walls by use of a dry gunning machine. In the hot repairing of furnace walls as disclosed in this publication, a complicated manufacturing process for covering the refractory granular bodies with pitch is required and it is difficult to make a uniform covering. As such, the components, when adhered to the walls of a furnace, are non-uniform and no particular improvement in erosion resistance can be actually demonstrated.

Japanese publication No. 27049/67 discloses refractory compositions for use as gunning mixes and stamping material in which the compositions comprise substantially non-acid refractory particles, 2–12% solid pitch particles, 0.05–4.0% of a plasticizer and 0.5–5.0% of a water soluble cold setting bonding component. The solid pitch particles are chosen to have a softening point of at least 200° F. (93.3° C.) and a particle size such that substantially the entire amount of pitch particles pass through a 4-mesh sieve and a substantial amount of particles are retained on a 100-mesh sieve (the sieves being standard Tyler mesh sieves).

SUMMARY OF THE INVENTION

In the present invention, refractory materials have been produced in which not only is the slag, molten pig iron or molten steel prevented from entering the structure of the refractories by the use of carbonaceous material but, also, durability, particularly with respect to erosion resistance, is greatly improved. These advantages are obtained by incorporating in the unshaped refractory material, such as gunning mixes, runner material and tap hole material, granules prepared from fine powder refractory material and carbonaceous material. The fine powder refractory may be the refractories of magnesia clinker, dolomite, magnesia-dolomite, high alumina, mullite recovered materials of such refractories recovered after use, or mixtures of two or more thereof. The carbonaceous material may be any one of: a thermosetting resin, a thermoplastic resin to which has been added pitch and a hardening agent, other resins, or mixtures of two or more thereof.

Heretofore, it has not been possible to impregnate unshaped refractory materials with carbonaceous material in advance by using conventional impregnating techniques commonly used for impregnating the bricks for a converter. By use of the present invention, however, the same effects can be achieved for all unshaped refractories by previously mixing and forming the granules of refractory fine powder and carbonaceous material, and then incorporating these granules in the unshaped refractory mixes.

DETAILED DESCRIPTION OF THE PREFERRED EMBODIMENTS

Preparation of the Granules

The unshaped refractories of the present invention comprise the addition of novel granules to conventional gunning mixes, runner material, tap hole material for blast furnaces, stamping material for hammering operation or ramming material, or the like. The novel granules of the invention may be prepared in either one of two ways.

In the first manner of preparation of the granules of this invention, a known fine powder refractory material is used. Such refractory material is selected or ground to a particle size of about 0.07–1.0 mm. The fine powder refractory material is then mixed in the desired proportion with a carbonaceous material, such as phenol resin and organic paste material. This mixture is then kneaded and, after kneading, is granulated by use of a conventional granulator. Finally, the granules are sieved to achieve the desired particle size.

Alternatively, molten pitch is mixed with the fine powder refractory material. This mixture is then kneaded and dropped to form granules.

The granules according to this invention are then incorporated in a known unshaped refractory material with the granules comprising the major component of the unshaped refractory.

The Fine Powder Material of the Granules

As a fine powder refractory for use in the granules of this invention, there may be used fine powders of magnesia clinker, dolomite, magnesia-dolomite, high alumina, mullite recovered materials of such refractories recovered after use or mixtures of two or more thereof. Recovered materials may include: for example, magnesia or dolomite bricks from a converter, which bricks have been recovered after use, crushed and sieved, and then mixed to form the granules of the invention. By this recovery and recycling of the magnesia or dolomite bricks, the resources are effectively recycled and manufacturing costs decreased. This is particularly so if the fine powder refractory material is produced from the recovery of tar-impregnated bricks, since the tar remaining within the pores of the powder wil ooze into the matrix portion during gunning and heating and form a rigid carbon-bond structure with the carbonaceous material which soaked through the granules during mixing, so that it is possible to further improve erosion resistance. Generally, a fine powder refractory particle size in the range 0.07-1.0 mm. is used. The reason is that if the fine powder is more than 1.0 mm. in particle size, the interior of the fine spheroids (after the carbonaceous material in the granules has melted and permeated into the matrix portion by heating) becomes too porous as described below thereby lowering the erosion resistance. On the other hand, if the fine powder of the refractory is less than 0.07 mm., the mixing and kneading with the carbonaceous material tends to become non-uniform, such that granules of uniform quality cannot be obtained.

The Carbonaceous Material of the Granules

The carbonaceous material referred to as useful in this invention is meant to include a material which if once heated at high temperature, it becomes carbonized or coked, i.e. an organic compound in principle. Specifically, there can be used alone or in combination, thermosetting resins in powdery state (such as phenol resin, furan resin, epoxy resin and melamine resin), thermoplastic resins in powdery state (such as polybutene resin and vinyl polymer) which are added with bituminous materials (such as various kinds of pitches and coaltar) and hardener, and other resins (such as cumarone resin, atactic polypropylene and polyester). However, those generally preferred are the materials of comparatively high residual carbon content, such as epoxy resin (10.1% by weight of fixed carbon content), melamine resin (10.2% by weight of fixed carbon content), furan resin (49.1% by weight), phenol resin (52.1% by weight of fixed carbon content) and coaltar pitch (52.5% by weight).

These carbonaceous materials are generally used as a fine powder having a particle size less than about 0.2 mm. The carbonaceous materials are added to the fine powder refractory along with a known organic paste, such as carboxymethylcellulose (CMC), the mixture is kneaded to obtain a uniform mix by any conventional method, and then the mixture is granulated by use of a conventional granulator, such as a pan-type granulator, to a particle size of about 0.7-5.0 mm.

PARTICLE SIZES AND INGREDIENT PROPORTIONS

Gunning Mixes

The particle size of the carbonaceous material and the mixing proportion with the fine powder refractory may be suitably varied according to use; however, the range of particle size will be about 0.7-3.0 mm. in the case of gunning mixes. The reason for this particle size range is that particle sizes greater than 3.0 mm. when used in gunning mixes require too much time to melt after having been adhered to the walls of a furnace, coking is delayed, and porosity increases. As a result, the desired erosion resistance is not obtained. On the other hand, with particle size less than about 0.7 mm., there is a tendency toward ignition and burning immediately after the gunning mix is blown out of the gunning nozzle and onto the furnace walls. It has been found in gunning mixes that a preferred ratio for improvement of erosion resistance is 60 parts by weight of fine powder refractory to 40 parts by weight of the carbonaceous material.

Runner Material and Tap Hole Material Mixes

With respect to the granules of the invention which are added to runner material and to tap hole material mixes of blast furnaces, their proper particle size will be in the range of 0.7-5.0 mm. The reason for this range is that with a particle size greater than about 5.0 mm., the spheroids (after the carbonaceous material in the interior has melted) are too great to obtain a sufficient erosion resistance. On the other hand, with a particle size less than 0.7 mm., the filling density after application of the mix is low and a sufficient amount of carbon necessary for coking will not be obtained.

In order to optimize the erosion resistance in terms of cost, it has been found preferable to use a particular mixing ratio. The preferred mixing ratio for use in runner material for the runners for discharging pig iron is 45 parts by weight carbonaceous material to 55 parts by weight of fine powder refractory. The ratio for use as tap hole material for blast furnaces is 30 parts by weight of carbonaceous material to 70 parts by weight of fine powder refractory.

UNSHAPED REFRACTORY MATERIAL MIXES INCORPORATING THE GRANULES

The granules can be used by themselves, however. Usually, one makes the best use of their properties when the granules represent from about 5-40% by weight of the unshaped refractory mix. The granules may be mixed in the desired proportion in commercially available unshaped refractory mixes. Alternatively, the user may prefer to prepare the unshaped refractory material mix at the site where it is to be used. When prepared at the site, the granules are mixed with suitable amounts (having due regard for the use to which the mix is to be put) of each of the other components of the unshaped refractory mix, including:

(i) refractory aggregate,
(ii) fine powder for matrix, and
(iii) a known binder.

The Aggregate Material

The refractory aggregate (hereinafter called the aggregate) in such an unshaped refractory mix may be one or more of: magnesia clinker, magnesia-dolomite clinker, electrofused alumina, coke, recovered used refractories or mixtures of two or more thereof. The aggregate is crushed, if necessary, to a particle size of less than 10 mm.

The Fine Powder Matrix Material

The fine powder may be selected from among the same materials as the aggregate and, additionally, from among magnesia, silicon carbide, silicon nitride or mixtures of two or more thereof. The fine powder is used at a particle size less than about 1.0 mm., and is mixed to form a matrix portion between the granules and the aggregate.

The Binder Material and Quantity

The preferred binder for these unshaped refractory mixes is a powdered sodium silicate plus a phosphate, such as sodium hydrogenphosphate or ammonium hydrogenphosphate. The amount of phosphate added is from about 3-8% by weight of the total weight of the other constituents. That is, the other constituents are added up and taken to represent 100% of the weight of the mix. A weight of phosphate is then added equal to about 3-8% of this total weight. Similarly, about 3-5% by weight of this total weight may be powdered slaked lime added to the total of the other constituents, which lime serves as a solidification accelerator.

The Quantity of Granules

The quantity of granules used in the unshaped refractory mix is, as mentioned above, between about 5-40% by weight and depends in part on the use to which the mix is to be put. In the case of gunning mixes, the ratio is preferably in the range of about 5-30% by weight in order to decrease the rebound loss as much as possible, and in order to form a rigid carbon-bond, sintered layer in the shortest possible time immediately after the gunning mix has adhered to the repaired portion of the converter.

In the case of runner material, it is preferred that the granules be present in a range of about 10-40% by weight to minimize the erosion resistance against slag and molten pig iron.

In the case of tap hole material for a blast furnace, it is preferred that the granules be present in a range of about 15-35% by weight in order to control, within limits, the speed of erosion of the tap hole, particularly in the discharge hole for pig iron while at the same time permitting a stabilized discharge operation of the pig iron.

Use as a Gunning Mix

The procedure for gunning these mixes onto the walls of a converter heated to 1,000°-1,200° C. and in which the walls are constructed of tar impregnated unburned magnesia-dolomite bricks will now be described.

When these gunning mixes are gunned onto the walls of a converter together with water by known gunning machines, after such gunning the entire mix is heated by the converter or furnace in normal atmosphere for a short time. This causes the binder to start an initial solidification. Then the carbonaceous material in the granules melts due to the heat of the converter and permeates uniformly into the matrix portion of the mix which is adhered to the converter walls. In this way, the carbonaceous material completely covers the surface of the aggregate in the mix.

After the passage of several minutes, the walls of the converter may be heated to a higher temperature at which the carbonaceous material is coked to form a carbon-bond structure of high strength and excellent adhesion to the walls of the converter. By this procedure, these gunning mixes do not fall off from the walls of the converter. Moreover, the stability of the volume of the sintered gunning mixes is improved (i.e. there is very little expansion or shrinkage) which, in turn, further increases the erosion resistance.

In conventional gunning mixes where pitch particles are added, small spherical voids remain after the pitch particles have melted and permeated into the matrix. As such, when the structure is sintered, it becomes porous and the durability is generally limited to from 5-6 charges.

Since the gunning mixes of the invention incorporate the granules (of refractory fine powder and carbonaceous material), the mixes adhere well to the converter walls and the molten carbonaceous material oozes entirely out of the granules. Even if the carbonaceous material permeated into the matrix, there is thereafter formed a small spherical structure within which remains the uniformly kneaded and mixed refractory fine powder. As such, the voids are not produced and the gunning mixes exhibit a strong resistance to erosion by the slag, thus enhancing the erosion resistance contributed by the coked matrix portion.

Use on a Discharge Runner

The unshaped refractory mixes of the invention may be pressurized in an inner former equipped with a vibrator in the discharge runner for pig iron in blast furnaces and thus molded under vibration as the so-called stamping material (to which no particular water or liquid binder is added except for an extremely small quantity of water adhered to the fine powder). A layer is formed on the inner side which is heated by the passing molten pig iron. This layer includes small spherical structures where the refractory fine powder remains internally. Even if the structure were eroded, the same may be continuously formed in the rear portion of the surface used (the heating surface). As such, a strong erosion resistance is exhibited against the slag with a demonstrable improvement in the durability of the discharge runner for pig iron furnaces.

EXAMPLE I

At iron foundry "A" a gunning mix of the following composition was hot gunned to the trunnion portion of a 250-ton converter lined with unburned tar impregnated magnesia-dolomite bricks by adding about 20% by weight of water and using known dry gunning apparatus. The adhesion ratio was good, being in excess of 85% and visual observation confirmed that its durability lasted through ten charges.

| Gunning Mix | |
| --- | --- |
| Ingredient | Parts by Weight |
| Aggregate | 40 |
| Fine Powder for Matrix | 40 |
| Granules | 20 |
| Binder | 8 |
| Solidification Accelerator | 3 |

The aggregate was crushed magnesia clinker having a particle size of about 1.0-3.36 mm.

The granules had a particle size of about 0.7-3.0 mm. and comprised 40 parts by weight of powdered phenol resin and 60 parts by weight of used refractory powders having a particle size of from about 0.3-1.0 mm. In this case, the refractory powder of the granules comprised magnesia-dolomite bricks that had been used once. Added to the resin and the refractory powder was a slight amount of organic paste (CMC) in aqueous solution. The mixture was made into the granules by use of a known granulator before incorporating the granules in the mix.

The fine powder for the matrix was magnesia having a particle size less than about 0.3 mm.

The binder comprised a mixture of sodium ultrapolyphosphate, sodium hexametaphosphate and sodium hydrogenphosphate in approximately equal weight amounts.

The solidification accelerator was slaked lime. The final gunning mixture was kneaded by known techniques to uniformity before use.

EXAMPLE II

At iron works "B" runner material (dry stamping material of 0.5% by weight water content) of the following composition was worked under vibration to the interior of the outer former of a large-sized discharge runner having walls with more than a 90° angle with respect to the bottom by using an inner former equipped with a vibrator having a rotary spindle, which apparatus is well-known. After a slight drying, molten pig iron was flowed over the material. It was found that the durability of the material was about 1.4 times that of conventional materials which latter exhibit a durability of about 130,000 tons.

| Runner Material Mix | |
|---|---|
| Ingredient | Parts by Weight |
| Aggregate | 30 |
| Fine Powder for Matrix | 40 |
| Granules | 30 |
| Powdered Pitch | About 1 |

The aggregate comprised crushed electrofused alumina (although sintered alumina may be substituted for all or any part of the electrofused alumina). One-half of the aggregate (15% of the main constituents of the material) comprised particles of about 1.0–8.0 mm. in size while the other half comprised particles of about 0.3–2.4 mm. in size.

The granules were of about 0.7–5.0 mm. in size and comprised 45 parts by weight of electrofused aluminum fine powder having a size of about 0.3–1.0 mm. Powdered phenol resin in an amount of one part by weight was also used and the mixture made into the granules by use of a known pan-type granulator before incorporation in the runner material mix.

The fine powder used as a matrix had a particle size of about 0.3–1.0 mm. and comprised two parts by weight of silicon carbide and two parts by weight of silicon nitride.

As the final unshaped refractory composition was being kneaded to uniformity by a known method, the powder pitch was added to the mixture.

EXAMPLE III

At iron works "C" tap hole material of the following composition was charged at the discharge hole of a large-sized blast furnace having 4000 m³ inside volume with such discharge being accomplished by use of a known mud gun. It was found that the hole opened more easily, that the discharge time for pig iron was 1.2 hours (about the same as with the conventional materials) but that a stable discharging operation of pig iron could be carried out for a considerable length of time.

| Tap Hole Material Mix | |
|---|---|
| Ingredient | Parts by Weight |
| Aggregate | 20 |
| Fine Powder for Matrix | 60 |
| Granules | 20 |
| Binder | 22 |

In this instance, the aggregate comprised crushed electrofused alumina, coke and used electrode scrap. The particle size of one-fourth of the quantity of aggregate was of about 1.0–2.4 mm. with the remaining three-quarters of the aggregate having a particle size of about 0.3–1.0 mm.

The granules had a size of about 0.7–2.50 mm. and comprised 30 parts by weight of powdered phenol resin, 70% by weight of mullite fine powder having a particle size of about 0.5–1.0 mm. and ten parts by weight of an aqueous solution of CMC containing 2% by weight CMC. This mixture was made into granules by use of a known pan-type granulator.

The fine powder for matrix comprised carbon and silicon carbide and had a particle size of less than 0.3 mm.

The binder was tar and was added while the mixture of aggregate, fine powder and granules was being kneaded to uniformity by use of a known kneader.

As mentioned above, the unshaped refractories of the invention may comprise only the granules of refractory fine powder and carbonaceous material, or such granules may be mixed with known aggregates. The invention prolongs the durability of unshaped refractories by about 1.5 times the conventional gunning mixes of non-carbon type. Still further, it is possible to utilize the scraps of bricks which have been used once thereby decreasing the cost of these unshaped refractories.

The invention has been described principally as used with gunning mixes, runner material, and tap hole material for blast furnaces but it will be appreciated that it is applicable to all unshaped refractories.

We claim:

1. An unshaped refractory comprising aggregate, refractory fine powder, granules, and a binder, said granules comprising a refractory fine powder mixed with adhering carbonaceous material.

2. The unshaped refractory of claim 1, in which the refractory fine powder of the granules is selected from the group consisting of refractories of magnesia clinker, dolomite, magnesia-dolomite, mullite, high alumina, recovered materials of said refractories after use, and mixtures of two or more thereof.

3. The unshaped refractory of claim 1, in which the particle size of said refractory fine powder used in said granules is in the range of from about 0.07–1.00 mm.

4. The unshaped refractory of claim 1, in which the carbonaceous material is a material which upon heating at a high temperature becomes carbonized or coked.

5. The unshaped refractory of claim 1, wherein the carbonaceous material is selected from the group consisting of thermosetting resin, or thermoplastic resin added with pitch and a hardening agent.

6. The unshaped refractory of claim 1, wherein the carbonaceous material is selected from the group consisting of epoxy resin, melamine resin, furan resin, phenol resin, coaltar pitch, and mixtures of two or more thereof.

7. An unshaped refractory as set forth in any one of the preceding claims, in which the particle size of the granules is in the range of from about 0.7–5.00 mm.

8. An unshaped refractory comprising aggregate, refractory fine powder, granules, and a binder, said granules comprising a mixture of refractory fine powder and carbonaceous material adhered to such fine powder, said refractory fine powder of said granules being selected from the group consisting of refractories of magnesia clinker, dolomite, magnesia-dolomite, mullite, high alumina, recovered materials of said refractories after use, and mixtures of two or more thereof, said carbonaceous material being selected from the group consisting of epoxy resin, melamine resin, furan resin, phenol resin, coaltar pitch, and mixtures of two or more thereof, said refractory fine powder orf said granules being in the range of from about 0.07–1.00 mm., and said granules being in the range of from about 0.7–5.00 mm.

9. Refractory granules comprising a mixture of refractory fine powder and carbonaceous material adhered to such fine powder, said refractory fine powder being selected from the group consisting of refractories of magnesia clinker, dolomite, magnesia-dolomite, mullite, high alumina, recovered materials of said refractories after use, and mixtures of two or more thereof, said carbonaceous material being selected from the group consisting of epoxy resin, melamine resin, furan resin, phenol resin, coaltar pitch, and mixtures of two or more thereof, said refractory fine powder being in the range of from about 0.07–1.00 mm., and said granules being in the range of from about 0.7–5.00 mm.

10. An unshaped refractory comprising aggregate, refractory fine powder, granules and a binder, said granules comprising a refractory fine powder mixed with adhering carbonaceous material and wherein said granules represent from about 5% to about 40% by weight of the unshaped refractory mix.

11. An unshaped refractory comprising aggregate, refractory fine powder, granules, and a binder said granules comprising a refractory fine powder in the range of about 55 parts to about 70 parts by weight mixed with adhering carbonaceous material in the range of about 30 parts to about 45 parts by weight.

12. The unshaped refractory of claim 10 or claim 11, in which the refractory fine powder of the granules is selected from the group consisting of refractories of magnesia clinker, dolomite, magnesia-dolomite, mullite, high alumina, recovered materials of said refractories after use, and mixtures of two or more thereof.

13. The unshaped refractory of claim 10 or claim 11, in which the particle size of said refractory fine powder used in said granules is in the range of from about 0.07–1.00 mm.

14. The unshaped refractory of claim 10 or claim 11, in which the carbonaceous material is a material which upon heating at a high temperature becomes carbonized or coked.

15. The unshaped refractory of claim 10 or claim 11, wherein the carbonaceous material is selected from the group consisting of thermosetting resin, or thermoplastic resin added with pitch and a hardening agent.

16. The unshaped refractory of claim 10 or claim 11, wherein the carbonaceous material is selected from the group consisting of epoxy resin, melamine resin, furan resin, phenol resin, coaltar pitch, and mixtures of two or more thereof.

17. An unshaped refractory as set forth in claim 10 or claim 11, in which the particle size of the granules is in the range of from about 0.7–5.00 mm.

* * * * *